No. 838,433. PATENTED DEC. 11, 1906.
S. W. MILLER.
VALVE.
APPLICATION FILED APR. 18, 1906.

Witnesses
Alice B. Cook.
Benj. Finckel

Inventor
Samuel W. Miller
by Finckel, Finckel
Attorneys

UNITED STATES PATENT OFFICE.

SAMUEL W. MILLER, OF COLUMBUS, OHIO.

VALVE.

No. 838,433.     Specification of Letters Patent.     Patented Dec. 11, 1906.

Application filed April 18, 1906. Serial No. 312,291.

*To all whom it may concern:*

Be it known that I, SAMUEL W. MILLER, a citizen of the United States, residing at Columbus, in the county of Franklin and State of Ohio, have invented certain new and useful Improvements in Valves; and I do hereby declare the following to be a full, clear, and exact description of the invention, such as will enable others skilled in the art to which it appertains to make and use the same.

This invention relates more particularly to that class of rotary valves in which the valve or plug proper is moved axially when the valve is turned to open the passage-way through it.

The object of the invention is to provide an improved and simplified construction of devices whereby great nicety in the adjustment of the means for moving the valve axially is secured and whereby compensation for wear of the parts is provided for.

The invention consists in the construction hereinafter described and claimed.

Figure 1:
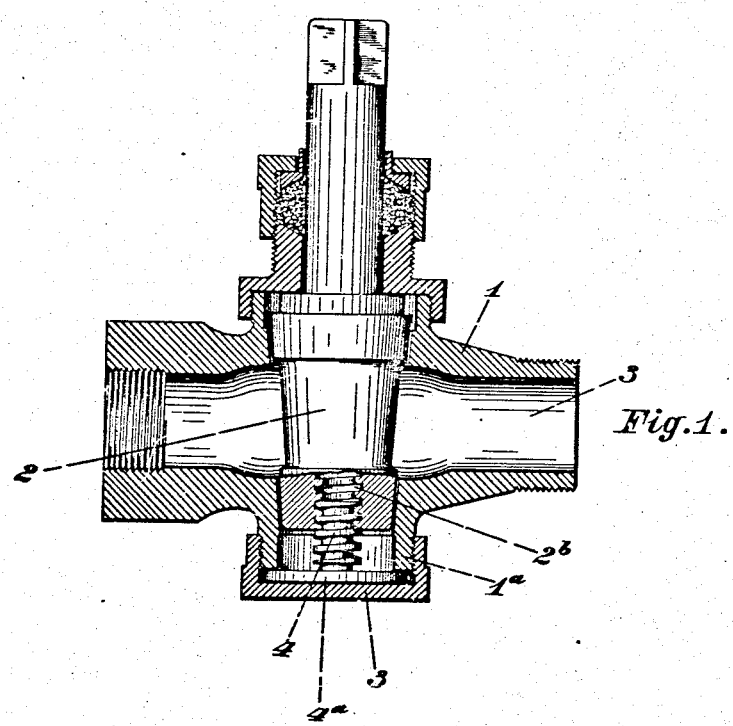
Figure 2:
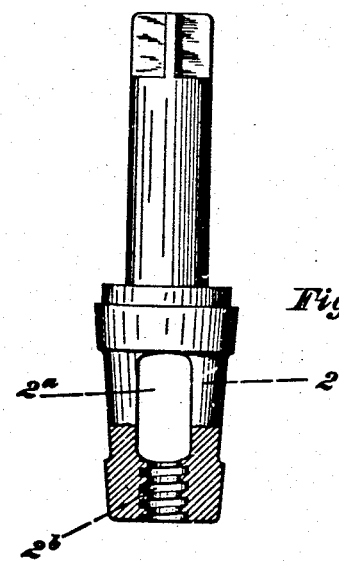
Figure 3:
Figure 4:
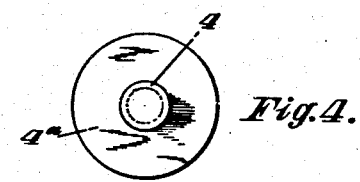

In the accompanying drawings, Figure 1 is a central sectional view through the casing, showing parts in full. Fig. 2 is an elevation of the plug, showing the threaded end in section. Fig. 3 is a detail in side elevation of the screw on which the plug works, and Fig. 4 is a top plan view of the screw shown in Fig. 3.

In the several views, 1 designates a casing of ordinary construction provided with a tapered transverse opening having a suitable seat for the rotary plug or valve 2 proper. The stem of the valve, by which it may be turned, is provided with an ordinary stuffing-box or packing, as shown in the upper portion of Fig. 1. The plug is provided with an ordinary opening $2^a$ for the passage of the fluid through it. The lower end of the plug is axially internally threaded, as seen at $2^b$. The smaller end of the plug-receiving opening is surrounded by a threaded flange $1^a$, onto which is turned a closing-cap 3.

4 designates a screw projecting from the center of a disk $4^a$. The screw is made to fit the thread $2^b$ of the plug, and the disk $4^a$ is of a diameter about equal to the diameter of the threaded flange $1^a$, or so that when the screw is put into place the disk can be pinched and held tightly from turning by turning up the cap 3.

Originally the parts are preferably so made and assembled that when the plug is turned from closed to passage-opening position it will be moved axially by the screw 4 off its seat, as seen in Fig. 1, and that this shall require approximately a quarter-turn of the plug.

In use the seat and seat-engaging portions of the plug naturally wear away, so that the plug cannot be properly seated and the passage closed. This wear is compensated for by removing the cap and adjusting the disk bearing the screw while the plug stands in the proper closing position or until approximately a quarter-turn only of the plug is practicable.

Because of this construction and because the disk bearing the screw may be turned through any degree, however slight, the proper adjustment of the screw to compensate for wear or to take up lost motion is very quickly and accurately made.

The forms and proportions of parts can be varied. For example, the disk need not be solid.

When the plug wears away, the opening movement can be limited by inserting one or more thin washers of appropriate thickness between the upper end of the plug and the bonnet.

What I claim, and desire to secure by Letters Patent, is—

1. In a valve the combination of a casing having a tapered valve-seat, a tapered plug or valve proper in the casing to close on said seat, said plug having a threaded opening in its smaller end, a screw to engage the threads of said opening, said screw provided with a laterally-extending part, and a cap to fix said laterally-extending part against the casing in position with reference to said plug or valve.

2. In a valve the combination of a casing having a tapered valve-seat, a tapered plug or valve proper in the casing to close on said seat, said plug having a threaded opening in its smaller end, a screw to engage the threads of said opening, said screw provided with a disk, and a cap engaging the casing to fix said disk against the casing in position with reference to said plug or valve.

3. In a valve the combination of a casing having a tapered valve-seat surrounded at its smaller end by a flange, a tapered plug or valve proper in the casing to close on said seat, said plug having a threaded opening in its smaller end, a screw to engage the threads of said opening provided with a disk adapted to impinge against said flange, and a cap to engage the flange and fix said disk against said flange in position with reference to said plug or valve.

In testimony whereof I affix my signature in presence of two witnesses.

SAMUEL W. MILLER.

Witnesses:
  OLIN J. ROSS,
  BENJ. FINCKEL.